ially shaped block-like inserts, and thus
form the body portion of a character or object to which
is attached various appendages of geometrical shape rep-
resenting the various body members of the object such as
an animal, doll or the like in which the starting letter of
the name of the animal or doll corresponds to the alpha-
betical block from which the object was constructed.

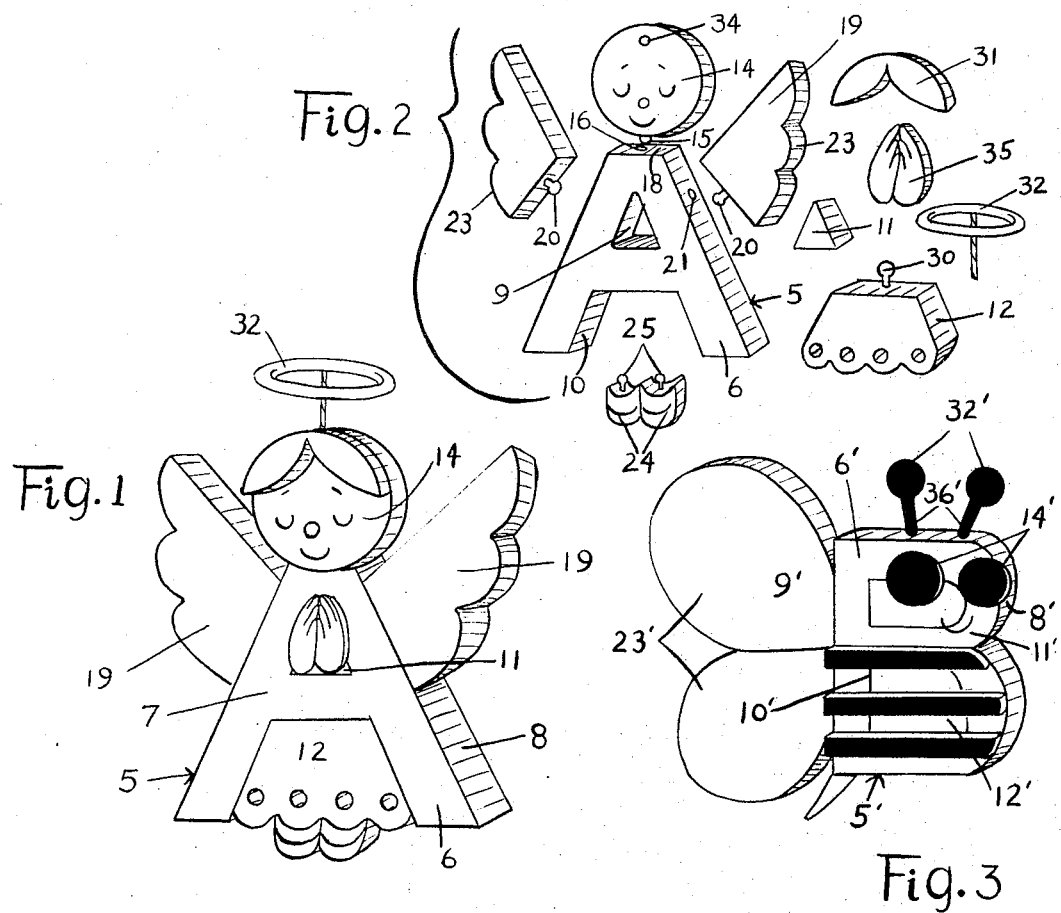
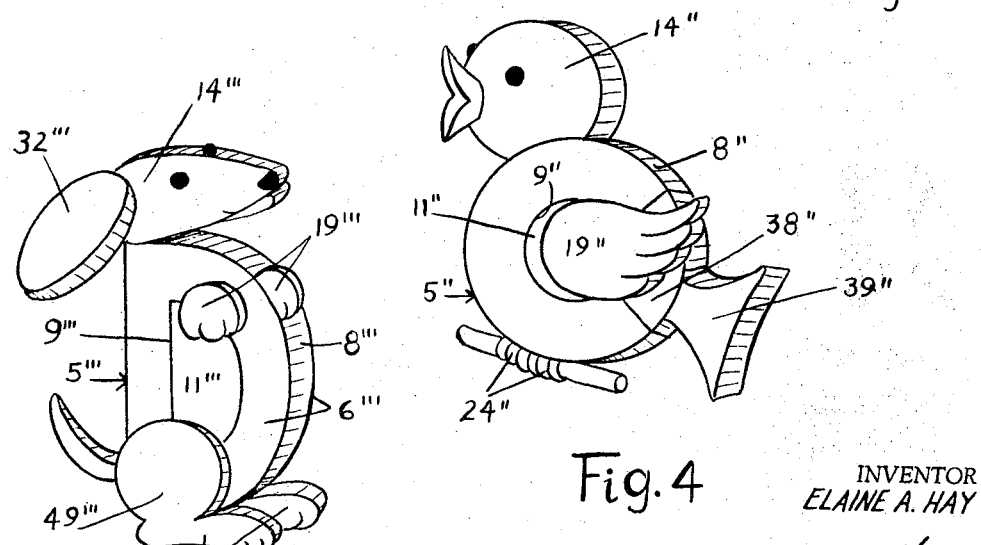

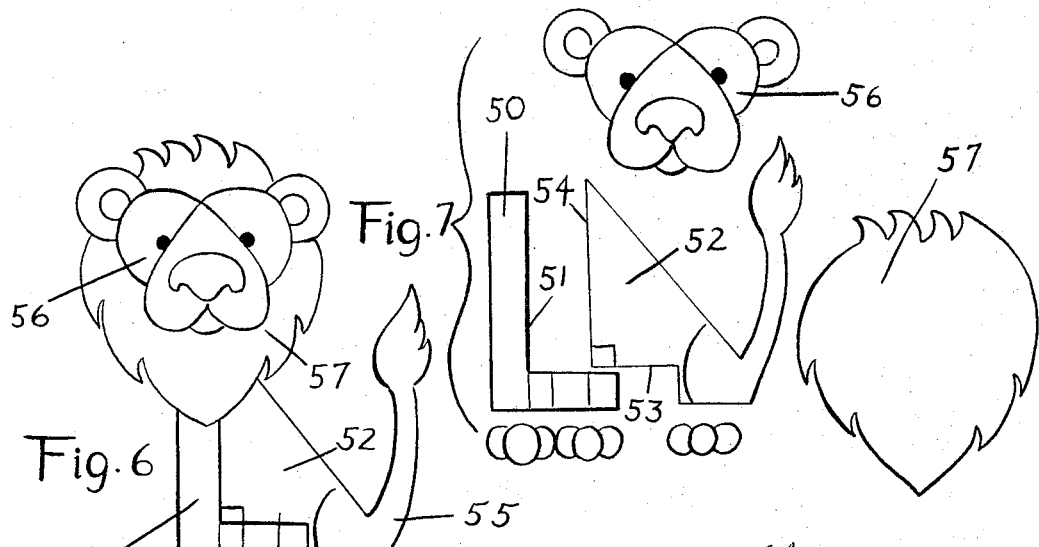
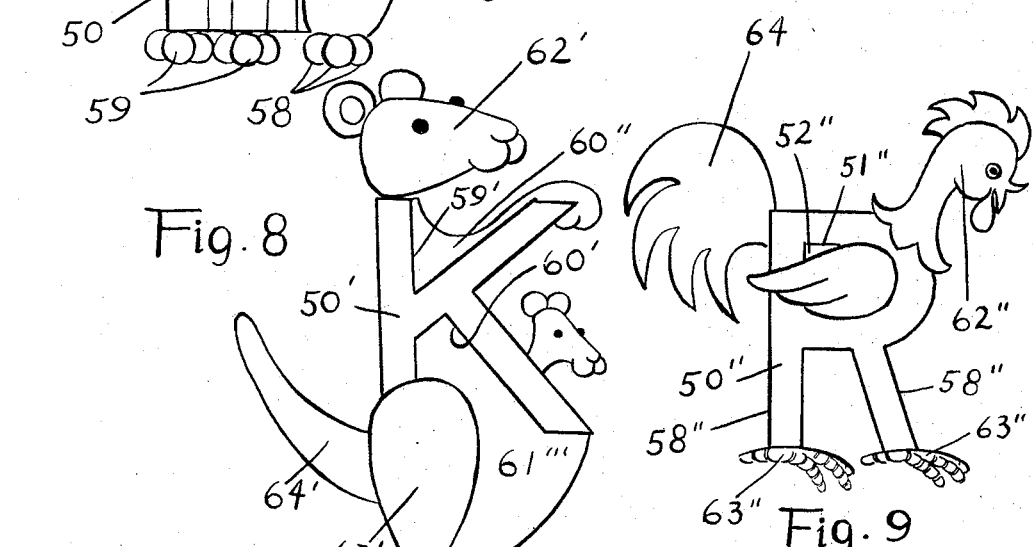
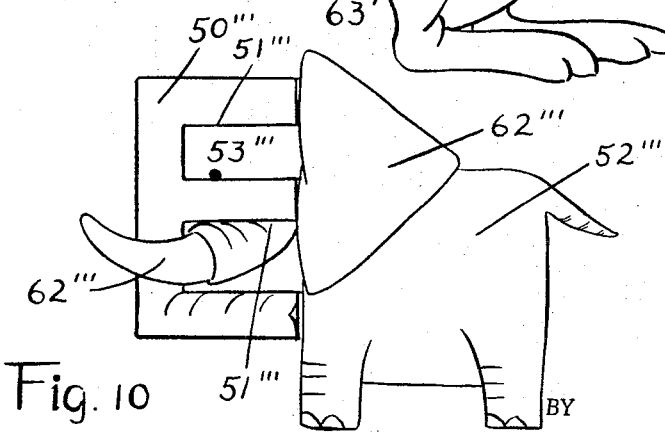

Another object is to provide an educational game and
puzzle of the alphabet type in which the letters of the
alphabet from A to Z are constructed in block-like form
having openings on various walls thereof and edge por-
tions for receiving snap-on type appendages.

United States Patent Office 3,365,198
Patented Jan. 23, 1968

3,365,198
ALPHABETICAL PUZZLE GAMES
Elaine A. Hay, 4713 Ravensworth Road,
Annandale, Va. 22003
Filed Sept. 17, 1964, Ser. No. 397,249
10 Claims. (Cl. 273—157)

The present invention relates to improvements in edu-
cational games and toys, and more particularly to an
alphabetical puzzle for teaching the alphabet and for the
amusement of children.

One object is to provide a game and puzzle for young
children to familiarize them with the alphabet and to
associate various animate and inanimate objects with the
letters of the alphabet.

Another object resides in the provision of a game in
the form of a puzzle in which geometrically shaped mem-
bers are provided to form the various appendages of
certain animated objects which can be applied to the vari-
ous letters of the alphabet, and in which the starting
letter of the name of the object or character depicts the
object from which the starting letter is formed.

Another object is to provide an educational amusement
device in the form of a puzzle in which the letters of the
alphabet are provided with geometrically shaped inserts
to form the body portion of various animate and inani-
mate objects and characters. The geometrically shaped
inserts are received in correspondingly shaped openings
in the letters of the alphabet so that the letter will repre-
sent the body portion of an object or character the name
of which begins with the letter from which the body
portion is formed.

Another object is to provide a series of letters of
the alphabet having body portions provided with geo-
metrically shaped openings for receiving correspondingly
shaped inserts so that the body portion can be completed
by the addition of appendages such as head, leg, arm and
foot portions. The completed puzzle will then represent
the name of an object which has the same starting letter
from which the object or character was made and will
thus build up in the minds of children word association
with certain letters of the alphabet and similarly, will
familiarize the children with the sounds of the various
letters of the alphabet by reason of the fact that they are
the beginning letters of similar sounding objects.

Another object is to provide an educational alphabeti-
cal puzzle which can be formed of relatively thin sheet
material such as paper and the like, and can be provided
with a pressure sensitive adhesive backing to permit all
of the elements of the puzzle to be applied to a base or
supporting sheet such as a looseleaf book or other form
of support, whereby the parts are easily removable after
assembly and can be conveniently stored in suitable re-
ceptacles provided for each letter of the alphabet.

Another object is to provide an educational amusement
device in the form of an alphabetical puzzle in which the
base elements are constructed of block-like elements
shaped to represent the letters of the alphabet and in
which the geometrical openings in the letters are provided
with correspondingly shaped block-like inserts, and thus
form the body portion of a character or object to which
is attached various appendages of geometrical shape rep-
resenting the various body members of the object such as
an animal, doll or the like in which the starting letter of
the name of the animal or doll corresponds to the alpha-
betical block from which the object was constructed.

Another object is to provide an educational game and
puzzle of the alphabet type in which the letters of the
alphabet from A to Z are constructed in block-like form
having openings on various walls thereof and edge por-
tions for receiving snap-on type appendages.

Another object is to provide an educational amusement
device in the form of an alphabetical puzzle in which
the block-like elements are constructed of a synthetic
resin plastic composition, and in which the inserts and
appendages are of a similar material and suitably colored.

Other objects and advantages of the invention will be-
come apparent during the course of the following descrip-
tion wherein:

FIGURE 1 is a perspective view of the assembled puz-
zle showing the geometrically shaped inserts received in
the A of the alphabet and showing the manner in which
the various head, foot and arm portions or body elements
are removably attached to represent an Angel.

FIGURE 2 is an exploded view showing the various
elements in perspective of the puzzle educational device
shown assembled in FIGURE 1.

FIGURE 3 is a perspective view showing the letter B
of the alphabet with the body element inserts in position
and the different body appendages removably attached
thereto to indicate an animated object such as a Bee.

FIGURE 4 is a perspective view of an educational
puzzle device familiar to FIGURES 1 to 3 inclusive in
which the block-like body portion is formed from the
letter C when the geometrical insert is in position to form
the body of a Canary.

FIGURE 5 is a perspective view of another puzzle
device constructed from a block-like element represent-
ing the letter D in which the central recess or opening is
filled by an insert of a geometrical shape to form the body
portion of an animated toy representing a Dog. The head
and foot portions are removably attached by snap-on
fastener means.

FIGURE 6 is a plan view of a modified form of the
invention in which the various body elements are formed
of relatively thin material such as plastic sheeting or
paper having a pressure sensitive adhesive.

FIGURE 7 is an exploded view showing the various
inserts and the like shaped to conform to the recess in
the letter L to represent a Lion.

FIGURE 8 is a plan view showing another letter of the
alphabet such as the letter K in which the body portion
of the animated object is formed by geometrically shaped
inserts.

FIGURE 9 is a plan view depicting another letter of
the alphabet R from which the body portion of a Rooster
has been constructed by a geometric insert positioned in
the recess of the letter to form the Rooster's body por-
tion, and FIGURE 10 is a plan view showing the manner in
which inserts of rectangular form can be shaped to repre-
sent the body and head portion of other animated objects
such as an Elephant.

In the drawings, and more in detail, attention is first
directed to FIGURES 1 and 2 wherein the educational
puzzle game is formed from a series of alphabetical blocks
from A to Z, and wherein the reference character 5 will
generally be employed to designate the A of the alphabet.
All of the alphabetical letter blocks are intended to be
formed of a synthetic resin plastic composition suitably
molded to shape and to form solid elements of a thick-
ness equal approximately to one or two inches. While all
of the letters of the alphabet from A to Z have geometri-
cally shaped openings or recesses, it is believed that a de-
scription of the invention as applied to the letter A will
suffice for all.

As shown in FIGURES 1 and 2 the letter A includes an
element 6 having front and rear walls 7 connected by side
wall portions 8. The upper portion of the element 6 is
provided with a triangular opening 9, while the lower
portion is provided with a geometrically shaped recess 10.
Inserts 11 and 12 corresponding in shape to the opening 9 and recess 10 are adapted to be inserted as shown in FIGURE 1 to form the body portion of a toy doll representing an Angel. Geometrically shaped appendages are attached to the element 6 as shown in FIGURES 1 and 2 and the head portion 14 is of round shape and is provided with a pin-type fastener having an expansible end portion 15 adapted to be received in a restricted opening 16 in the top wall 18 of the body element 6. Similarly, wing or arm portions 19 of somewhat triangular shape are provided with push-on type fasteners including an expansible head pin element 20 adapted to be received in restricted openings or sockets 21 of the side walls 8. Adjacent walls of the triangular shaped appendages 19 extend parallel and normal respectively to the side walls 8 and the hypotenuse sides 23 are suitably shaped to represent wing portions.

Similarly, detachable foot portions 24 are provided with push-on type fastener pins 25 adapted to be received in restricted socket openings (not shown) in the insert 12. Certain inserts such as 11 and 12 of the various letters of the alphabet can be frictionally held in place, while others may be held in place by pin fasteners 30 of the push-on type similar to those shown as at 15–16 and 20–21.

The puzzle doll can have applied thereto various appendages such as a cap portion 31 and a halo 32 by suitable push-on fasteners in the round head 14 and in suitable openings thereon as at 34. Also, decorative elements such as 35 can be applied to the various inserts 11 and 12 by similar fasteners or fastening means.

In form, the assembled puzzle represents an Angel as shown in FIGURE 1 having a substantially solid body portion formed by the letter block 5 and the inserts 11 and 12. The head portion 14 and other appendages are of a thickness substantially equal to the thickness of the side walls 8 so that when the puzzle is completed a doll-like character will be provided.

In FIGURE 3 the block-like character is generally designated 5′ and includes side and front walls 6′ having edge walls 8′. Upper and lower recesses 9′ and 10′ are formed in the body portion 5′ and these recesses are adapted to be filled by inserts 11′ and 12′ of a geometrical shape in which one end of a rectangular portion is slightly curved. The inserts 11′ and 12′ form a substantially solid body for animated objects such as a Bee having appendages such as geometrically shaped members 23′ of ovate shape depicting wings which are attached to the walls 8′ between the front and rear walls 6′ by snap-on type fasteners similar to those shown as at 15–16 and 20–21 in FIGURES 1 and 2. Other appendages of geometrical shape are attached such as disc-like elements 14′ to represent eyes and disc-like portions 32′ connected to the edge walls 8′ by pin-type fasteners 36′ received in correspondingly shaped sockets in the body portion.

The representation in FIGURE 4 depicts an animated doll formed from C and includes a body portion generally designated 5″ having a central round opening or recess 9″ having a removable insert 11″ of correspondingly round design to snugly fit in the recess 9″. The insert 11″ is provided with a triangular extension 38″ having a projection 39″ depicting the tail portion of the Canary. The head portion 14″ is formed of a disc connected to the body portion 5″ by suitable pin fasteners such as those shown at 15–16 and 20–21 in FIGURES 1 and 2. Similarly, other appendages such as wing portions 19″ are adapted to be attached to the insert 11″ or to a portion of the body having the shape of the particular letter of the alphabet. Foot portions 24″ are similarly connected to the side walls 8″ of the character C by suitable push-type pin fasteners similar to those shown at 15–16 in FIGURE 2.

In FIGURE 5 there is shown another type of alphabet character or letter having a body portion generally designated 5‴ and including front and rear walls 6‴ spaced by an edge or side wall 8‴ connecting the front and rear walls. The letter D is shown and is formed similar to the letters in FIGURES 1, 3 and 4 of synthetic plastic material to provide a block shaped to represent the letter D. The letter block 5‴ is provided with a semi-elliptical opening 9‴ having a correspondingly shaped insert 11‴ formed of a block-like element of geometrical shape with its major axis extending along the inner vertical wall of the recess 9‴ and its elliptical wall fitted within the bow portion of the letter D. The insert is snugly and frictionally held in place and forms a substantially solid body portion having certain appendages attached thereto to represent an animated object such as a toy dog doll. A head portion 14‴ is secured to the upper portion of the character or letter by suitable push-on pin and socket fasteners as shown in FIGURE 1 as at 15–16 and foot portions 24‴ are provided with disc-like members 49‴ having pin and socket push-type fasteners to connect the elements 24‴ and 49‴ to the body portion 5‴. Other limb elements such as paws 19‴ are similarly secured to the side or edge wall 8‴ as well as to the front wall or rear wall 6‴. Geometrically shaped round members 32‴ are attached to the head portion 14‴ to represent ears or other appendages and are held in place by the type of pin and socket push-on fasteners shown in FIGURE 2.

In FIGURES 1 to 5, the various puzzle elements can be formed hollow of a synthetic resin plastic composition, wood or various artificial compositions and are adapted to be colored corresponding to the animated object or doll which they represent. For instance, the major portion of the doll shown in FIGURES 1 and 2 would be colored white, while the major portion of the objects shown in FIGURES 3 and 4 will be colored in various shades of yellow to represent the coloring of a Bee and the coloring of a Canary, while the object shown in FIGURE 5 will be colored brown to represent the coloring of a Dog. It will thus be seen that the body portion of the character or letter of the alphabet is filled with inserts received in the openings and recesses of the characters or letters to form a substantially solid body and are frictionally held in place by either the mutually engaging walls or by means of the pin-type push-on fastener elements.

In the modified form of the invention shown in FIGURES 6 and 7 the various parts of the puzzle are formed of relatively thin, sheet-like material such as paper, cardboard or synthetic plastic material such as polyethylene of a thickness of between 1/50 to 1/100 of an inch and the sheet is cut as shown in FIGURE 7 to form a letter of the alphabet such as the letter L as at 50. In forming the same a geometrical recess 51 is formed having adjacent right angular edges. The insert comprises a geometrically shaped element 52 provided with mutually engaging edges 53 and 54 which are adapted to be placed in position as shown in FIGURE 6. An extension 55 is formed on the insert 52 in the shape of a tail or the like so that the portions 50 and 52 will form the body of an animated object such as a Lion the first letter of which is used in constructing the object. Various appendages such as a head portion is cut and shaped from the material and indicated as at 56 so that it may be placed on another cut-out portion 57 and the cut-out portions 56 and 57 then placed in position as shown in FIGURE 6 to represent the head and mane of the Lion. Limb or foot portions 59 and 58 are placed in position to form the remainder of the object.

The various puzzle elements 50 to 58 inclusive are provided on their rear surfaces with a self-adhering pressure sensitive coating well known in the art, and the puzzle elements are assembled on a sheet of paper by merely pressing the elements into position with the fingers. Thus, a child can start with the particular letter of the alphabet and then by selecting the various inserts can form the body portion of the animated object by pressing the same in position with the mutually engaging edges 53 and 54 engaging the edges of the recess 51 formed by the vertical and horizontal portions of the letter L.

Various letter characters of the alphabet can similarly be used in forming the alphabetical puzzle, and as shown in FIGURE 8 the character K or letter 50′ is cut to provide upper and lower geometrically shaped recesses such as 59′ and 60′. Geometrically shaped inserts are provided and as shown a substantially triangular insert 60″ is provided for the recess 59′, while a trapezoidal-shaped insert 61‴ is inserted in the lower recess. Thus, the body portion of an animated object such as a Kangaroo is formed the initial letter of which constitutes the main portion of the body element of the puzzle. Puzzle elements 62′ and 63′ are cut from the sheet material to form head and limb appendages which may be pasted in position on the base sheet (not shown) to which the puzzle is applied by assembling the elements thereof and securing them in place by pressure in a manner similar to that shown in FIGURES 6 and 7.

In FIGURE 9 the main portion of the animated object or doll is formed from the letter R cut from the sheet of material to provide a semi-elliptical opening 51″ and the extensions of the character 58″ form the limbs of the animated object. A geometrically shaped insert 52″ corresponding in shape to the opening 51″ is inserted in said opening to form a body portion of the object. Various appendages such as head, tail and foot portions 62″, 64″ and 63″ are formed from the sheet material and are adapted to be placed in position adjacent the body portion to complete the animated object such as a Rooster the initial letter of which forms the major portion of said body.

FIGURE 10 illustrates the manner in which a letter of the alphabet 50‴ such as the letter E is employed when forming different animated objects, and in the present case, a representation of an Elephant. The letter 50‴ is formed from thin plastic flexible material, paper, cardboard or the like and is shaped to represent the letter E and is provided with cutouts or recesses 51‴. The body portion 52‴ is provided with interfitting projections 53‴ arranged in spaced relation to be received in the recesses or cutouts 51‴. The body portion 52‴ can have applied thereto various appendages such as 62‴ to represent the ears and tusks of the animated object.

In the form of the invention shown in FIGURES 1 to 5 inclusive the interfitting block-like parts of the puzzle game are formed of a synthetic resin plastic composition such as polystyrene or other synthetic compositions of the polyethylene group, while the form of the invention shown in FIGURES 6 to 10 inclusive is constructed of similar plastic sheeting, cardboard or paper having a thickness of from .006 to .05 inch in thickness. The backing sheet upon which the cutout puzzle elements are placed is of a similar thickness and can constitute a sheet of plain paper having markings or delineations thereon conforming to the cutout puzzle elements as an aid to the child or participant in the puzzle game. In the forms of the invention shown in FIGURES 6 to 10 inclusive the thin flexible material from which the cutouts are made has applied to the rear surface a pressure sensitive adhesive material manufactured by the Minnesota Mining & Manufacturing Company, and is sold under the brand name "Scotch Brand." The cutouts can be formed of pressure sensitive Scotch Brand sheeting as manufactured by this company under Catalog No. 167 and of a thickness of approximately .005 inch.

In the form of the invention shown in FIGURES 1 to 5, the block-like puzzle elements are of a thickness of from .05 to 3 inches and are made in accordance with dimensions of the animate or inanimate object.

In assembling the puzzle parts in FIGURES 1 to 5 inclusive the alphabetical letter is selected and the body inserts are first placed in their proper position within the recesses formed in the block-like elements and thus form a body for a particular animated or inanimate object. Next, the various appendages corresponding to the body portion are assembled by the push pin fastener elements which frictionally hold the same in place.

In playing the puzzle game in FIGURES 6 to 10, certain puzzle cutouts are selected for a particular letter of the alphabet and the inserts are placed in position within the recesses in the letter to form a body portion corresponding to the animated or inanimate object. After the body portions are properly assembled in their correspondingly shaped recesses the various appendages such as head, legs, arms and the like are adhesively affixed in position to represent an animated or inanimate object the initial letter of which forms the object of the puzzle as well as the name of the object.

In both forms of the invention the alphabetical letter is suitably colored by marking, printing or the like and the corresponding insert is similarly colored by marking or printing to match the coloring of the alphabetical letter and thus form the body portion of an animated or inanimate object. The coloring can be variegated on the letter and insert to represent wings, feathers and other appendages corresponding to the type of animated or inanimate object formed by the matching letter and insert.

It is to be understood that the forms of the invention herewith shown and described are to be taken as preferred embodiments thereof, and that various changes in the shape, size and design of the parts can be resorted to and that the different parts can be colored or have marked or printed thereon in various colors lines and circles representing the coloring of a particular animated or inanimate object.

What I claim is:

1. An alphabetical puzzle game for teaching letter and object association comprising a series of puzzle elements shaped to represent letters of the alphabet, and each having at least one cutout forming a recess, inserts shaped to correspond to the shape of said recesses adapted to be inserted in said recesses to form a complete body portion resembling the natural body shape of an animated or inanimate object, and a series of appendages attachable to said body portion to form an animated or inanimate object, said letter puzzle elements, inserts and appendages when assembled in proper relation forming a series of individual objects the initial letter of which in the name thereof corresponds to the selected letter of said alphabet, said appendages being shaped to resemble various natural body parts of said body portion.

2. An alphabetical puzzle game as set forth in claim 1 in which said puzzle elements are suitably colored to correspond to the natural color of animated and inanimate objects.

3. An alphabetical puzzle game as set forth in claim 1 in which said puzzle elements are formed of flexible synthetic sheet material having a pressure sensitive adhesive on one side thereof.

4. An alphabetical puzzle game as set forth in claim 1 in which said puzzle elements are formed of thin synthetic resin plastic compositions applied to a backing sheet by a pressure sensitive adhesive on at least one of the surfaces thereof.

5. An alphabetical puzzle game as set forth in claim 1 in which said puzzle elements and inserts are suitably colored so that the color of the letter of the alphabet corresponds to the color of the insert to form a body portion of a particular animated or inanimate object in accordance with its natural coloring.

6. An alphabetical puzzle game for teaching letter and object association comprising a series of puzzle elements formed of thin sheet-like flexible synthetic plastic material cut to resemble the shape of letters of the alphabet and each having at least one recess forming an opening, a series of inserts each corresponding in shape to said openings adapted to be received therein to form the complete body portions of animate objects, other cutouts attachable to said body portions to form objects, said letter puzzle elements, inserts and appendages when assembled in proper relation forming a series of individual animated objects the name of each of which corresponds to the initial letter and the selected letter of the alphabet, said cutouts being provided on at least one face surface with a pressure sensitive adhesive.

7. An alphabetical puzzle game for teaching letter and object association, comprising a series of block-like puzzle elements shaped to represent letters of the alphabet, each of said block-like puzzle elements being provided with a recess, a plurality of inserts each corresponding in shape to the recess in the selected alphabetical letter to form the complete body portion of an animate object, appendages attachable to said block-like puzzle elements to form a representation of an object, said letter puzzle elements, inserts and appendages when assembled in proper relation and interfitting order forming a series of individual objects the initial letter of each of which in the name thereof corresponds to the selected letter of the alphabet, and fastener means for securing said appendages in position, said appendages being shaped to resemble body parts of the anatomy corresponding to the animated object.

8. An alphabetical puzzle game, as set forth in claim 7, in which said block-like puzzle elements are formed of a synthetic resin plastic composition.

9. An alphabetical puzzle game, as set forth in claim 7, in which said fastener means for the appendages comprises pin and socket push-type fasteners between the block-like puzzle elements and said appendages.

10. An alphabetical puzzle game, as set forth in claim 7, in which said appendages and inserts are of geometrical form.

References Cited

UNITED STATES PATENTS

| | | | |
|---|---|---|---|
| D.120,112 | 4/1940 | Schmidt | 35—35 X |
| 1,230,263 | 6/1917 | Alexander | 35—35 |
| 1,256,100 | 2/1918 | Bamberg | 273—157 |
| 1,439,336 | 12/1922 | Smith | 273—157 |
| 1,864,703 | 6/1932 | West | 35—71 |
| 2,848,823 | 8/1958 | Washburn | 35—35 |

FOREIGN PATENTS 524,102   7/1940   Great Britain.

ANTON O. OECHSLE, *Primary Examiner.*